(12) United States Patent
Walraet

(10) Patent No.: US 7,336,161 B2  
(45) Date of Patent: Feb. 26, 2008

(54) TIRE PRESSURE MONITORING SYSTEM

(75) Inventor: David Walraet, Saint Germain en Laye (FR)

(73) Assignee: Johnson Controls Automotive Electronics, Cergy Pontoise Cedex (FR)

(*) Notice: Subject to any disclaimer, the term of this patent is extended or adjusted under 35 U.S.C. 154(b) by 190 days.

(21) Appl. No.: 11/121,706

(22) Filed: May 4, 2005

(65) Prior Publication Data

US 2006/0087420 A1    Apr. 27, 2006

(30) Foreign Application Priority Data

May 4, 2004   (FR) .................................. 04 04780

(51) Int. Cl.
   *B60C 23/00*     (2006.01)
   *B60C 23/02*     (2006.01)

(52) U.S. Cl. .................. 340/442; 340/445; 73/146
(58) Field of Classification Search ............... 340/442, 340/445, 447; 73/146, 146.5

See application file for complete search history.

(56) References Cited

U.S. PATENT DOCUMENTS

| | | | |
|---|---|---|---|
| 5,559,484 A * | 9/1996 | Nowicki et al. | 340/442 |
| 6,362,732 B1 * | 3/2002 | Konchin et al. | 340/446 |
| 6,466,887 B1 | 10/2002 | Weinbrenner | |
| 6,591,671 B2 * | 7/2003 | Brown | 340/442 |
| 6,734,791 B2 * | 5/2004 | Kelly et al. | 340/445 |
| 7,164,975 B2 * | 1/2007 | Bidaud | 73/146 |
| 7,177,739 B2 * | 2/2007 | Kuchler | 340/447 |

FOREIGN PATENT DOCUMENTS

DE    198 49 390 A1    5/2000
FR    2 833 523 A1     6/2003

OTHER PUBLICATIONS

French Search Report for Application No. FR 0404780, 2 pages.

* cited by examiner

*Primary Examiner*—John Tweel, Jr.
(74) *Attorney, Agent, or Firm*—Foley & Lardner LLP

(57) ABSTRACT

A tire pressure monitoring system for the wheels of a motor vehicle determines the position of each wheel.

32 Claims, 3 Drawing Sheets

TIRE PRESSURE MONITORING SYSTEM

CROSS-REFERENCE TO RELATED PATENT APPLICATIONS

The present application claims priority to French Application No. 0404780 filed May 4, 2004, the disclosure of which is hereby incorporated by reference.

TECHNICAL FIELD

The present application relates to tire pressure monitoring systems for vehicles and more particularly to vehicles having a pressure sensor and transmitter on a plurality of wheels which transmits the pressure to a control unit.

BACKGROUND

In these systems, referred to in the art as TPMS (Tire Pressure Monitoring System), the signals sent by the pressure sensors include data which allows them to be identified. If the wheels on a vehicle were never changed, simple initial learning of the association between the signals and the wheels would allow the position of the sensors in relation to the vehicle's chassis to be determined. This analysis is necessary to be able to locate defective tires.

However, as the wheels on a vehicle are from time to time re-positioned or swapped over, the problem of locating the wheel on which the sensor is mounted remains.

Some solutions have already been proposed. In particular, in patent application FR 0116368, the Applicant describes a tire pressure monitoring system where the rotation speeds calculated using the data supplied by the pressure sensors is compared with the data determined by fixed wheel rotation speed sensors with a known position. In particular, the latter relate to ABS (Anti-lock Brake System) sensors. The ABS system uses an individual sensor for each wheel giving its angular position in the form of pulses. These correspond to the distances that the wheel travels in the order of several centimeters.

It is known that the wheels on a vehicle do not all rotate at the same speed. In a straight line, for example, a difference in the tire pressures, or even in the degree of wear in the tire tread, leads to a difference in the wheel diameter and therefore the rotation speed. The vehicle's dynamics, the load distribution and the temperature are also factors which influence the rotation speed of the wheels in relation to each other.

When the trajectory is curved, the differences in rotation speeds due to the difference in the radiuses of curvature of each wheel's trajectory are added thereto.

These differences are utilized, therefore, to conduct this analysis. To this end, the difference is calculated between the speed of each fixed sensor and that speed which is calculated using the data supplied by the pressure sensors. In this way, each of the fixed sensors can be associated with the pressure sensor with the lowest calculated difference in speed. This system is advantageous in that it uses existing means and thus avoids additional expenditure. In addition, it has proved reliable as regards to the quality of the fixed sensors on the anti-lock brake system.

However, there are many instances where the speeds measured are all very similar. The convergence of the calculation is therefore rather slow and the system's reaction time is relatively long; up to 15 minutes have been counted. The pressure sensors are powered by batteries located inside the tires which, therefore, makes access difficult. It is therefore advisable to limit their energy consumption as much as possible. It would therefore be advantageous to limit the transmission time of the sensors.

In application FR 02 11 843, the Applicant, having set an objective of improving the wheel location means in a tire pressure monitoring system by using a means which reduced the transmission time of the sensors, proposed attaching to the pressure sensor means for determining the phase shift between two pressure signal transmissions performed at two points, T1 and T2. However, this solution did not fully satisfy either the efficiency requirements which it set out to achieve.

This is the reason why the Applicant is now proposing an improved version of this invention.

SUMMARY

According to one embodiment, the tire pressure monitoring system for a motor vehicle comprises a control unit, a pressure sensor mounted on each wheel which is associated to a transmitter by which it transmits a pressure signal to the control unit containing at least the sensor's identification data, and means for determining the distance traveled by each wheel, transmission control means adapted to control the transmission of the transmitters when their associated wheel reaches a predetermined orientation, means for timing the transmissions, a module for calculating the distance traveled by each wheel between two transmissions and a positioning module for comparing the distances determined by the means for determining the distance the wheel has traveled and distances determined by the calculation module.

In one embodiment, if C is the length of the wheel's circumference, the distance traveled by each wheel between two transmissions is that which corresponds to an integer N of wheel revolutions, that is, N.C. Without phase shifting the transmissions all that is required is to count the number N of transmissions received from the transmitter between two successive transmission points, T1 and T2.

It follows that the time required to locate the wheels can be both much quicker and more reliable.

In addition, the phase shift DT between the transmissions at any two transmission points, T1 and T2+DT, is a measurement of the distance the wheel travels modulo its circumference C. It is therefore also possible to have a continuous and accurate angular wheel phase shift measurement to measure, as previously, the distance traveled.

The means for determining the distance traveled may comprise the fixed sensors of an anti-lock brake device or an electronic stability system.

Also, the transmission control means may comprise an accelerometric sensor (or accelerometer) which may have sensitive dual-axes which determines a specific single orientation of the earth's gravitational force in relation to a reference fixed to the wheel.

More precisely, the transmission control means comprise an accelerometric sensor and an electronic signal suppression processing circuit which it supplies in order to suppress the DC component of the centrifugal force and to determine a specific single orientation of the earth's gravitational force in a reference fixed to the wheel.

In this way, with the two sensitive axes positioned in a vertical plane, the transmission control means determine a specific single predetermined orientation of the reference marker fixed to the wheel in relation to the vehicle, and can control the transmitter at the point, T1 or T2, where the wheel has this specific single orientation.

Alternatively, instead of an accelerometer with sensitive dual-axes, the transmission control means comprise two accelerometric sensors with a single sensitive axis, with the two sensitive axes being inclined in relation to one another and located in a vertical plane.

By using this equivalent means, the specific orientation is also detected without ambiguity, and the detection algorithm is very short, which limits the energy consumption of the batteries located inside the tires.

The invention will be better understood with the help of the following description of the tire pressure monitoring system, according to the invention, with reference to the accompanying drawings, wherein:

DETAILED DESCRIPTION

Figure 1A:
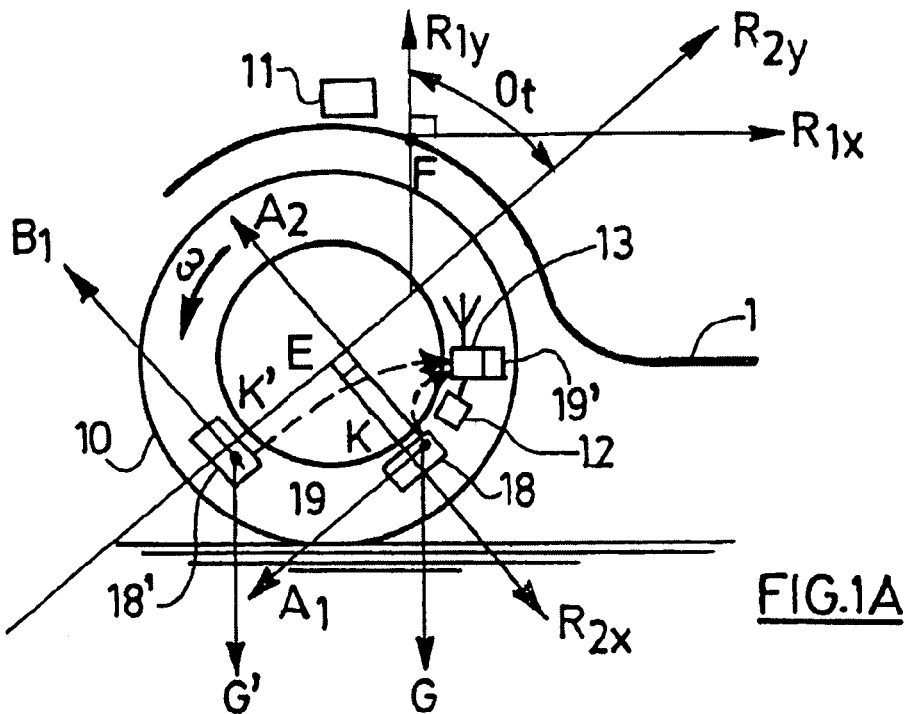
FIGS. 1A and 1B each represent one of the vehicle's wheels with its sensors and shows drawings of the R1x, R1y and R2x, R2y and R2 axes of the references R1 and R2 fixed to the vehicle and to the wheel respectively, according to an exemplary embodiment.

As can be seen in FIG. 1A, each wheel 10 is provided with an assembly comprising a sensor 12 for pressure P coupled with a transmitter 13 in the tire of the wheel 10, and an ABS or ESP sensor 11 located on the vehicle 1 at F close to the wheel 10.

In effect, an ESP (Electronic Stability Program) device can be used in place of the ABS device.

The vehicle 1 is identified by way of a reference R1 which is fixed in relation thereto, comprising two orthogonal axes R1x and R1y located in a vertical plane and with a datum position at F.

The wheel 10 is identified by way of a reference R2 which is fixed in relation thereto, comprising of two orthogonal axes R2x and R2y located in a vertical plane and with a datum position in its centre E.

When the wheel 10 turns at an angular speed .omega., its reference R2 turns and orientates itself relative to vehicle reference R1 at an angle Ot, or an orientation Ot, whichever is preferred, as a function of time t. For simplicity, let it be assumed that the vehicle is not negotiating a corner.

At this point, the transmitter 13 is controlled, in a manner explained below, using the electronic circuit 19 of an accelerometric sensor 18 with dual-axes, A1 and A2, for example a piezoelectric sensor, fixed at K inside the tire of the wheel 10. This amounts to the same as providing two accelerometric sensors, 18 and 18', with one axis each, represented by A1 and B1 respectively, located in K and K'. The B1 axis, being parallel to A2, plays exactly the same role therefore as A2, but it is not necessary for the accelerometers, 18 and 18', to have their sensitive axes arranged orthogonally. In this case, the accelerometers are each fitted with an electronic circuit 19, 19' for processing the supplied signals.

Figure 1B:
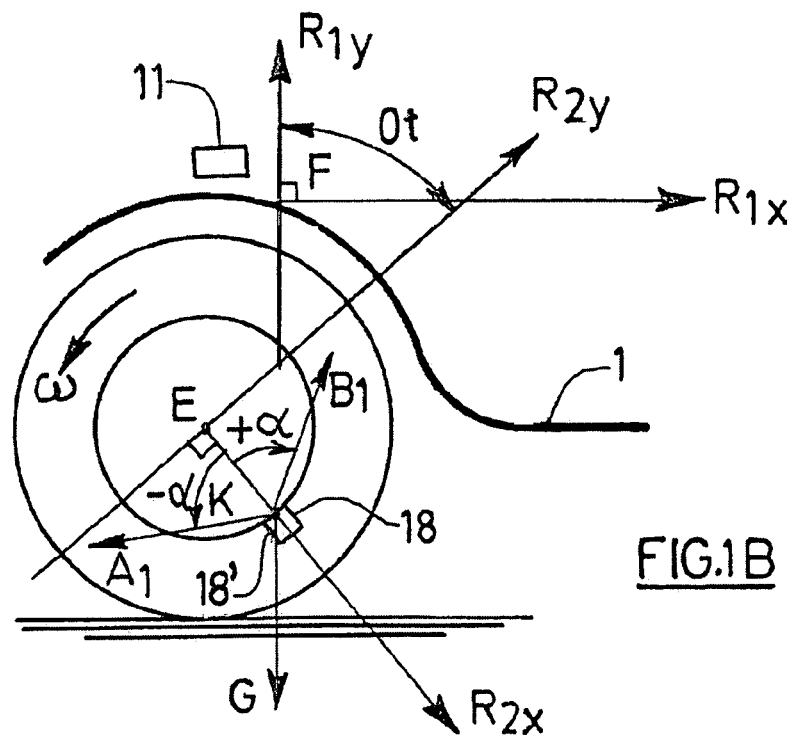

In a preferred embodiment points K and K' are combined at K, and the A1 and B1 axes form an angle (A1, B1) allowing the R2x or R2y axes to act as a bisecting line and they both form an angle .alpha. with this axis, as shown in FIG. 1B.

Figure 2:
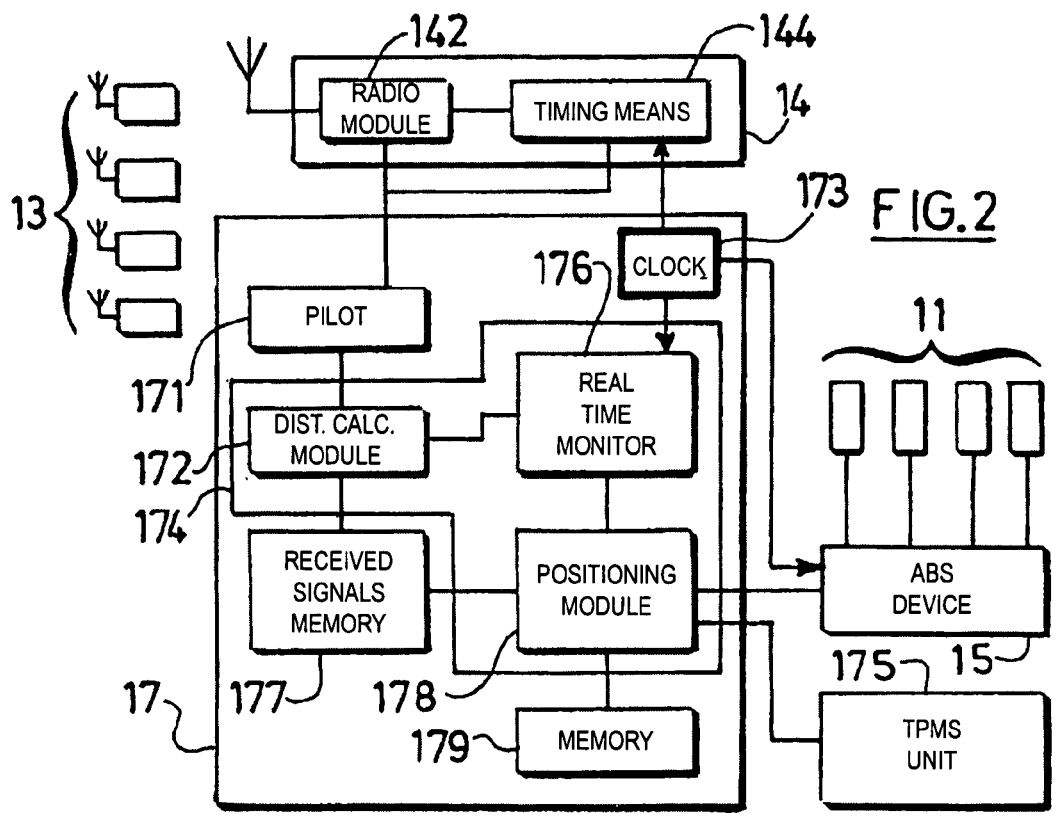
FIG. 2 represents a block diagram of an exemplary system.

With reference to FIG. 2, a fixed receiver 14 mounted on the vehicle receives the signals transmitted by the transmitters 13 at points T1, T2 . . . determined subsequently. In addition to a radio module 142 which transforms the radio signals into digital data, the receiver 14 also comprises means of timing counted by a clock 173, the assembly guarantees the timing T of the signals P received and other signals specified hereafter. The signals and their timings are transmitted to a control unit 17 comprising a microprocessor 174 and are stored in a received signals memory 177. A pilot 171 guides the receiver 14.

Furthermore, the unit 17 receives the data D of the distances the wheels have traveled and their timing T', evaluated using sensors 11 by way of, for example, the ABS device 15, as well as the positioning, or the identification $I_{ABS}$, of the sensors 11 at the point of evaluation of these distances. This data is stored in a distances traveled memory 179.

Finally, to coordinate the assembly, the microprocessor 174 comprises a real time monitor 176 counted by a clock 173, a distance calculation module 172 and a module 178 effecting positioning by comparison of the distances traveled.

These means allow the control unit 17 to deliver the pressure, identification and positioning data to a TPMS unit 175 for management of this data, already described in the previously mentioned documents.

The operation of the system will now be described.

Figure 3:
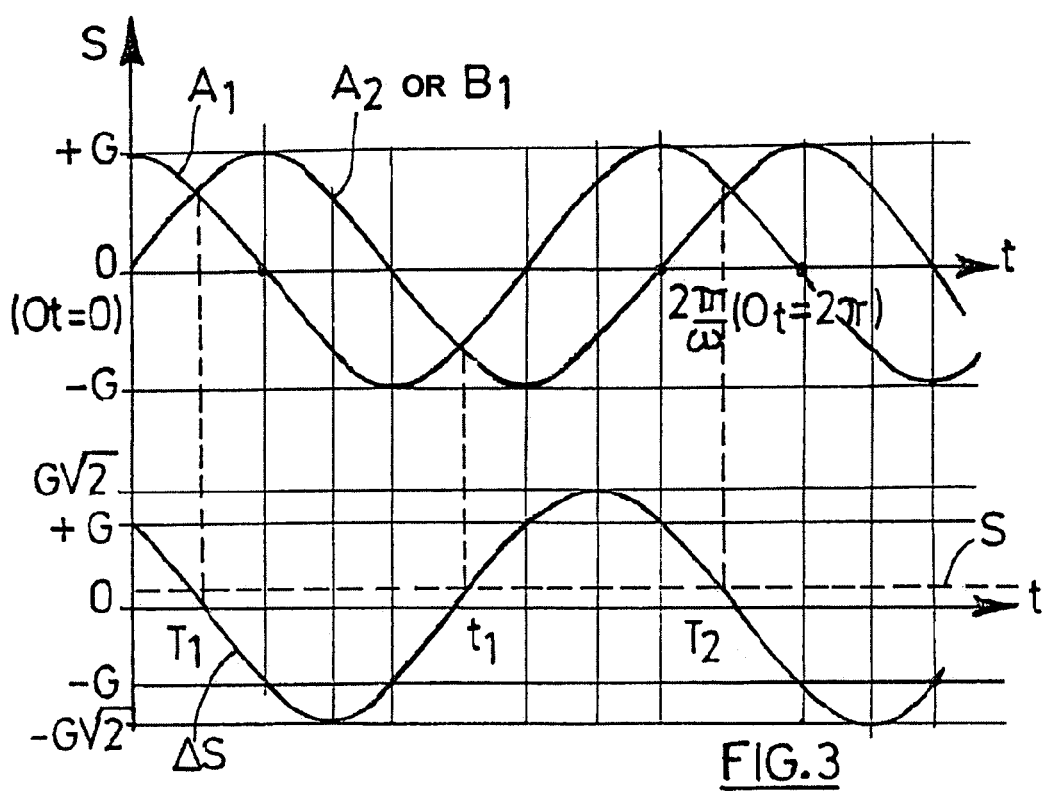
FIG. 3 represents a diagram of the signals supplied and used by the transmitter's control unit, according to an exemplary embodiment.

When the wheel 10 turns at an angular speed .omega., the accelerometric axes A1, on the one hand, and A2 or B1, on the other hand, supply electronic circuits 19 or 19' with the signals referenced by the same reference points used on the amplitude versus time t curve, represented in the upper part of FIG. 3. At a uniform speed, these signals are sinusoidal having an amplitude given by the earth's gravitational force G, of period 2..pi./.omega., normally centered on the DC components FC1, FC2, of the centrifugal force experienced by the sensors. They are phase shifted in relation to one another by an angle of .pi./4. If the axes are not orthogonal, this phase shift is different, but this does not change the operating principle. Normally, the DC components, FC1 and FC2, are suppressed from the signals by circuits 19 and 19' in order to centre the latter on 0, but in one embodiment the two signals, A1 and B1, as shown in FIG. 3, are centered on a single component FC1=FC1=Fc and do not need to be suppressed, as will be explained below.

Figure 4:
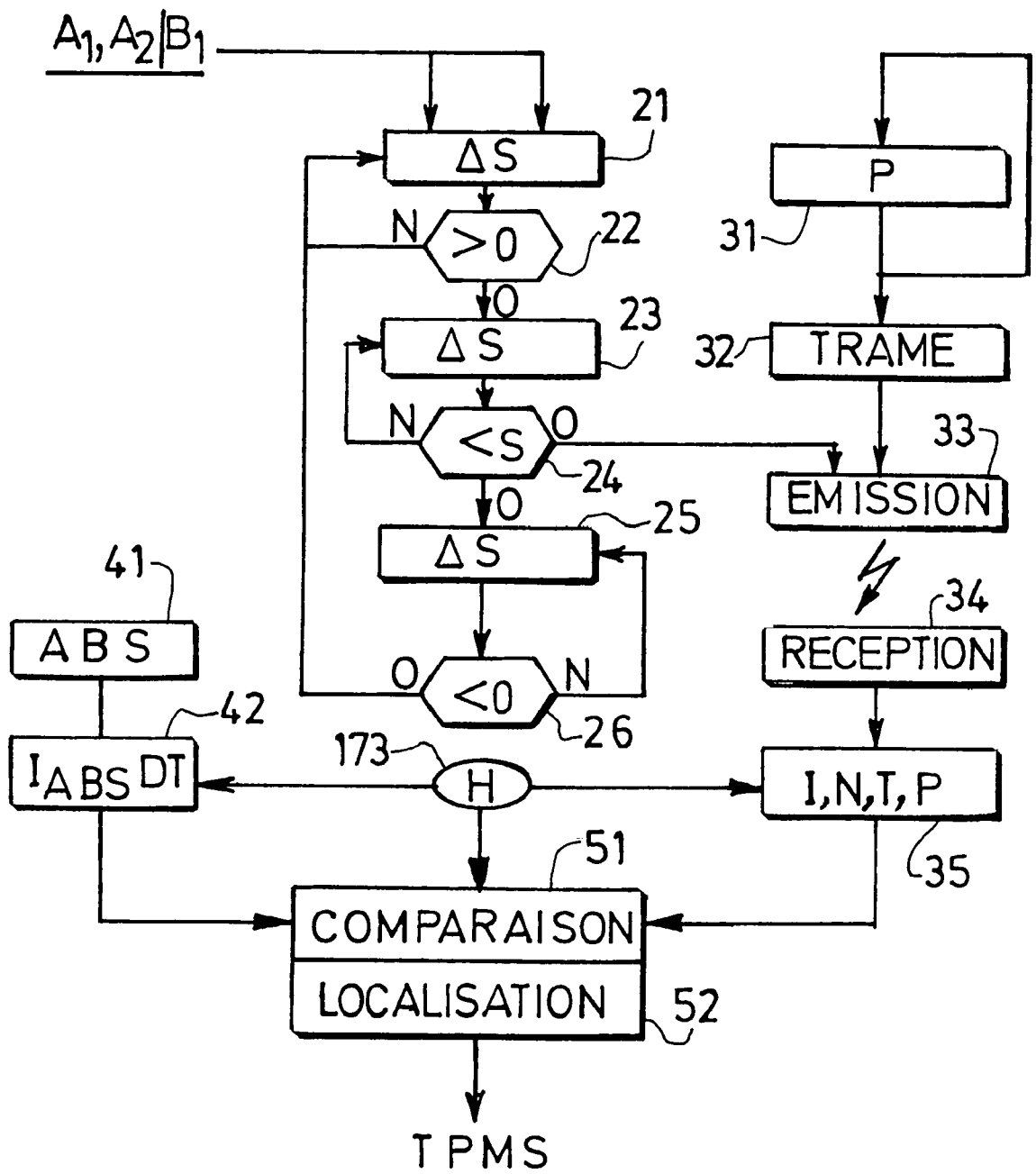
FIG. 4 is a flow diagram of the measurement principle for the distances the wheels travel, according to an exemplary embodiment.

The electronic circuits 19 or 19', during stages 21, 23, 25, with reference to FIG. 4, perform a subtraction, which is preferably analogue, using an operational or digital amplifier, of signals A1 and A2 or B1, to obtain a difference .DELTA.S in accordance with the curve identified in the same manner in the lower part of FIG. 3. It can be noted in this way that by calculating .DELTA.S, because they are opposed, FC1 and FC2 are automatically suppressed from the signal.

In constant speed conditions, this curve is sinusoidal having an amplitude of G2 and an identical period to the previous one.

The .DELTA.S signal is processed, whilst still in the electronic circuit 19 or 19', in accordance with stages 21 to 26 of the flow chart in FIG. 4, to detect its zero crossings, such as at points T1 and T2, whilst eliminating the zero crossings such as at points t1, which correspond to half-revolutions of the wheel 10. At these points T1, T2, . . . , the wheel 10 reference R2 is orientated in accordance with an angle or an orientation Oto in relation to R1, the vehicle reference, that is, in relation to the direction of the gravitational force G.

To this end, at stage 22, points such as t1 are eliminated by only selecting the zero crossings in the .DELTA.S positive to .DELTA.S negative direction, and if .DELTA.S is negative one waits or its sign to change (at a point such as t1 in the figure).

At stage 23, .DELTA.S is calculated whilst waiting for a zero crossing, for a transmission command. At stage 24, a zero crossing of the signal is detected by comparing it to a threshold S below which it is considered as such.

When threshold S is reached, stage 33 is started so that transmitter 13 can complete the transmission of pressure signals produced by the sensor 12 during stage 31, in accordance with a field generated by this same sensor during stage 32.

Advantageously, when the system only has one single accelerometer, it will be the detection of the level of the signal's AC component, following suppression of the DC component, which will allow stage 33 to start. This signal can be processed in a similar way to signal .DELTA.S described above.

Therefore, for each wheel, the transmitter's control means detect the successive points T1, T2, . . . , corresponding to the passages of the wheel at orientation Oto, numbered in order N1, N2, . . . N, and control the transmitter at these points which correspond to complete revolutions of the wheel, at distances corresponding to the full lengths of the wheel circumference C.

At the same time, stages 25 and 26 are started in order to wait for an effective passage of .DELTA.S to negative values, in order not to cause two successive transmissions in the same wheel revolution.

A dwell time can be added to the system limiting the number of transmissions, in particular, at high speeds.

After reception, at reception stage 34 performed by the radio module 142 of the receiver 14, stage 35 for creating the field starts, containing the identification I, timing T and pressure P data, possibly containing the numbering N of wheel revolutions. Stage 35 is carried out by the timing means 144 and 173, and is then completed by the "TPMS" distance calculation module 172, in accordance with the following formula: $D_{tpms}=C.N.$ During this same stage, the calculation module 172 then stores the data that has been calculated in the memory 177 with the pressure, timing and identification thereof.

At the same time, the ABS system performs its usual algorithms 41 in order to supply its data of distances D, and for the identification of $I_{ABS}$ of the ABS sensor.

During stage 42, the ABS module 15 attaches thereto the timing T' of this data, T' being supplied by module 173, and stores this "ABS" data in the memory 179 using the positioning module 178.

By using memories 177 and 179, the comparisons of distances D and $D_{tpms}$ contained in the ABS and TPMS data can be carried out during stage 51 by the positioning module 178, to ascertain, during stage 52, the position of the wheels, that is to say, the correlation between the identifications I and $I_{ABS}$, as is known by those skilled in the art, notably with reference to the previously mentioned documents.

The invention claimed is:

1. Tire pressure monitoring system for wheels of a motor vehicle, comprising:
   a control unit,
   a pressure sensor mounted on each wheel associated to a transmitter by which it transmits a pressure signal to the control unit containing, at least, the pressure sensor's identification data, and
   means for determining a distance traveled by each wheel,
   transmission control means adapted to control transmission of transmitters when their associated wheel reaches a predetermined orientation,
   means for timing the transmissions,
   a module for calculating the distance traveled by each wheel between two transmissions, and
   a positioning module for comparing the distances determined by said means for determining the distance traveled by each wheel and the distances determined by said calculation module.

2. System according to claim 1, wherein the means for determining the distance traveled comprise the fixed sensors of an anti-lock brake device or electronic stability device.

3. System according to claim 1, wherein the transmission control means comprise an accelerometric sensor with sensitive dual-axes.

4. System according to claim 3, wherein an electronic circuit for the accelerometric sensor with sensitive dual-axes is adapted to determine a specific predetermined orientation of the earth's gravitational force in relation to the reference of the wheel.

5. System according to claim 1, wherein the transmission control means comprise two accelerometric sensors with one sensitive axis.

6. System according to claim 3, wherein both sensitive axes are inclined in relation to one another.

7. System according to claim 3, wherein one or both of the sensitive dual axes are positioned in the wheel plane.

8. System according to claim 1, wherein the transmission control means are adapted to control the transmitter at the point where the wheel has a specific predetermined orientation.

9. System according to claim 8, wherein the specific predetermined orientation is a predetermined orientation of wheel reference in relation to the orientation of the earth's gravitational force.

10. System according to claim 4, wherein the transmission control means comprise an accelerometric sensor and an electronic circuit for processing the suppression of the signal which it provides to suppress the DC component of the centrifugal force and to determine a specific single orientation of the earth's gravitational force in a fixed reference of the wheel.

11. A method for associating a particular pressure sensor with a particular wheel, comprising:
   transmitting a signal from a transmitter coupled to a wheel, the signal including information capable of being used to identify the wheel, the first information being transmitted from one of a plurality of unknown wheel locations;
   using the signal from the transmitter to determine first information relating to the wheel;
   determining second information relating to the wheel, the second information being received from a known wheel location; and
   comparing the first information and the second information to associate a pressure sensor with a wheel location;
   wherein the transmitter coupled to the wheel does not need to continuously transmit a signal in order to determine the first information.

12. The method of claim 11, wherein the transmitter is configured to transmit signals based upon an orientation of the wheel.

13. The method of claim 12, wherein the transmitter is configured to transmit signals at a predetermined orientation.

14. The method of claim 12, wherein the transmitter is configured to transmit signals at a single predetermined orientation.

15. The method of claim 12, wherein orientation is determined with respect to earth's gravitational force.

16. The method of claim 11, wherein the transmitter is coupled to an accelerometric sensor.

17. The method of claim 16, wherein the accelerometric sensor comprises at least a first axis and a second axis.

18. The method of claim 16, wherein the accelerometric sensor comprises a single axis and the transmitter is coupled to a second accelerometric sensor.

19. The method of claim 16, further comprising suppressing a component of data from the accelerometric sensor relating to centrifugal force.

20. The method of claim 16, further comprising determining an orientation of the wheel with respect to gravity using the accelerometric sensor.

21. The method of claim 11, wherein the second information is determined using a first system of the vehicle that has a purpose in addition to providing data related to the second information.

22. The method of claim 21, wherein the first system is a stability control system.

23. The method of claim 11, wherein the transmitter is configured to transmit data relating to tire pressure from a pressure sensor.

24. The method of claim 23, wherein the second information is determined using a first system of the vehicle that has a purpose in addition to providing data related to the second information.

25. The method of claim 24, wherein the transmitter is configured to transmit signals based upon an orientation of the wheel.

26. The method of claim 25, wherein at least one of the first information and second information relate to a distance traveled by the wheel.

27. The method of claim 26, wherein an orientation of the wheel is determined using an accelerometric sensor coupled to the transmitter.

28. The method of claim 11, wherein at least one of the first information and second information relate to a distance traveled by the wheel.

29. A method for associating a particular pressure sensor with a particular wheel, comprising:
   transmitting a signal from a transmitter coupled to a wheel based on an orientation of the wheel, the signal including information capable of being used to identify the wheel, the first information being transmitted from one of a plurality of unknown wheel locations;
   using the signal from the transmitter to determine first information relating to the wheel;
   determining second information relating to the wheel, the second information being received from a known wheel location; and
   comparing the first information and the second information to associate a pressure sensor with a wheel location.

30. The method of claim 29, wherein the orientation of the wheel is determined using an accelerometric sensor.

31. The method of claim 29, wherein at least one of the first information and second information relate to a distance traveled by the wheel.

32. The method of claim 29, further comprising
   receiving information from a plurality of transmitters associated with different unknown wheel location; and
   receiving information from a plurality of sensors at known wheel locations;
   wherein comparing the first information and the second information comprises comparing information from the plurality of transmitters at unknown wheel locations and information from the plurality of sensors at known wheel locations.

* * * * *